Oct. 31, 1961     E. H. PARKHURST, JR     3,006,370
CONTROL SYSTEM FOR ACTUATORS

Filed July 25, 1960     6 Sheets-Sheet 1

INVENTOR.
EDWIN H. PARKHURST, JR.
BY CHARLES B. McDONALD
AGENT

INVENTOR.
EDWIN H. PARKHURST, JR.
BY CHARLES B. McDONALD
AGENT

INVENTOR.
EDWIN H. PARKHURST, JR.
BY CHARLES B. McDONALD
AGENT

Oct. 31, 1961 E. H. PARKHURST, JR 3,006,370
CONTROL SYSTEM FOR ACTUATORS
Filed July 25, 1960 6 Sheets-Sheet 5

INVENTOR.
EDWIN H. PARKHURST, JR.
BY CHARLES B. McDONALD
AGENT

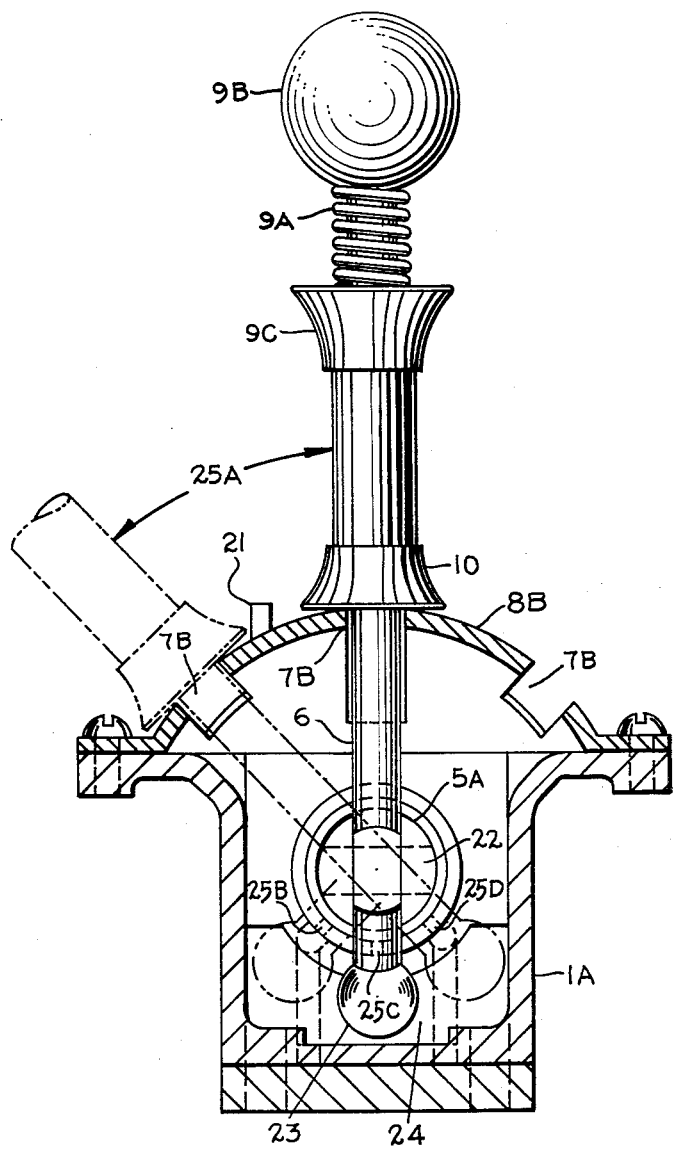

United States Patent Office 3,006,370
Patented Oct. 31, 1961

3,006,370
CONTROL SYSTEM FOR ACTUATORS
Edwin H. Parkhurst, Jr., Cleveland Heights, Ohio, assignor to Park Manufacturing Company, Cleveland, Ohio
Filed July 25, 1960, Ser. No. 45,100
1 Claim. (Cl. 137—622)

This invention relates to a system for selectively controlling the operation of a plurality of fluid operated actuators, such as actuators used in shifting gears of automotive transmissions.

One object of the invention is to selectively deliver fluid under pressure to actuators for automotive transmissions and other actuators for controlling the speed of driving mechanisms.

Another object of the invention is to provide a simple, efficient, low cost, compact valve assembly that operates under fluid pressure at all times to deliver fluid under pressure to selected outlet ports.

A further object of the invention is to provide a single manually operated shift lever arranged to move one or more slide valves under pressure in their respective cylindrical bores to selected outlet ports to deliver fluid under pressure to desired service ports.

A further object of the invention is to provide a manually operated port selector device that may be shifted from one position to another to open and close outlet ports with very little effort.

With the foregoing objects of the invention in view and others thereof which will appear as the description of the invention proceeds, the invention resides in the combination and arrangement of parts and the details of construction hereinafter described and claimed, it being understood that changes in the invention as herein disclosed can be made within the scope of what is claimed, without departing from the spirit of the invention.

Further objects of the present invention will be evident from the following description of the invention, as illustrated in the accompanying drawings, in which:

FIG. 10 is a view of FIG. 7 at right angles to FIG. 9.

Figure 1:
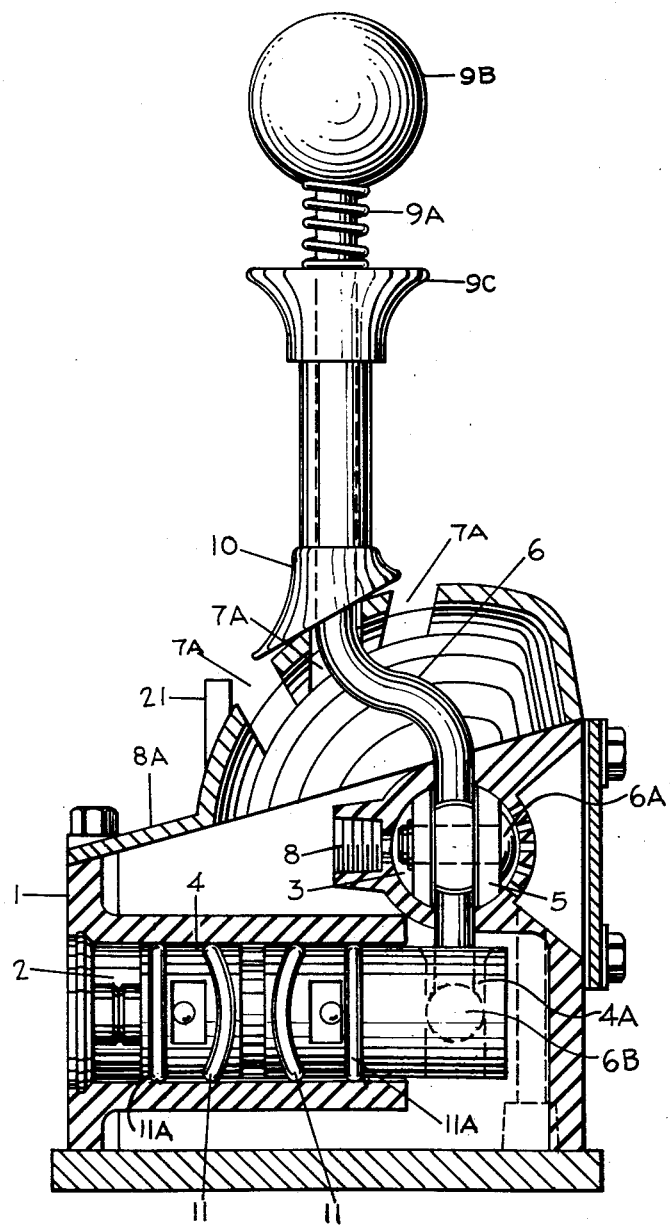
FIG. 1 is a view of the invention, partly in section, showing the lower cylindrical bore and slide valve in its central position.
Figure 2:
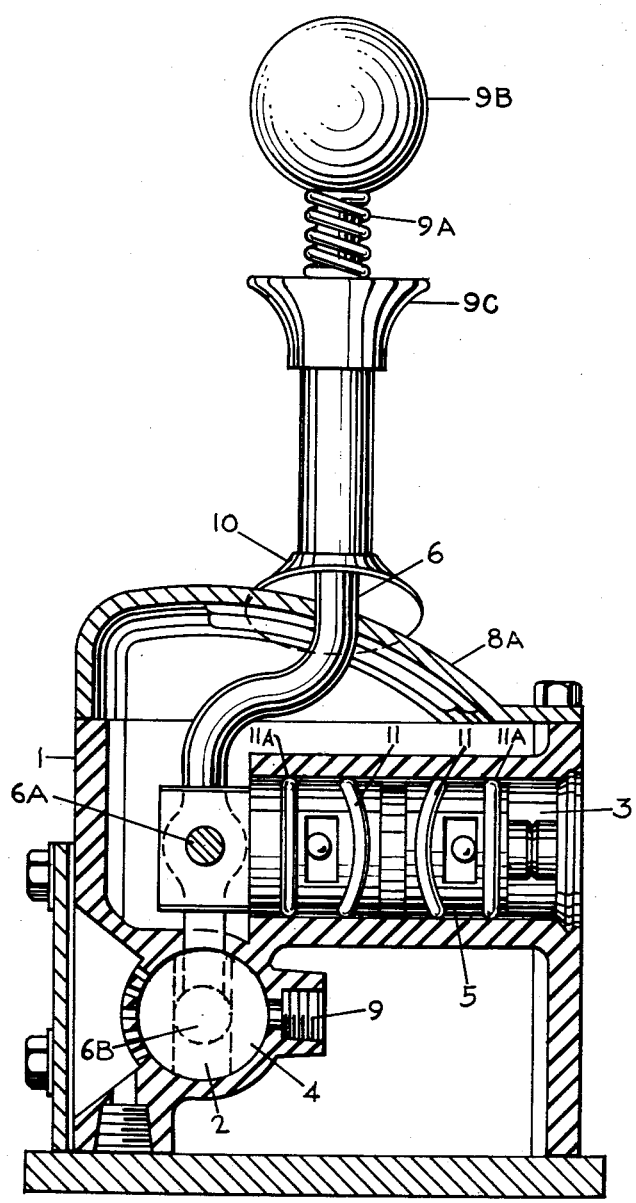
FIG. 2 is a view at right angles to FIG. 1 showing the upper cylindrical bore with its slide valve in central or neutral position.
Figure 3:
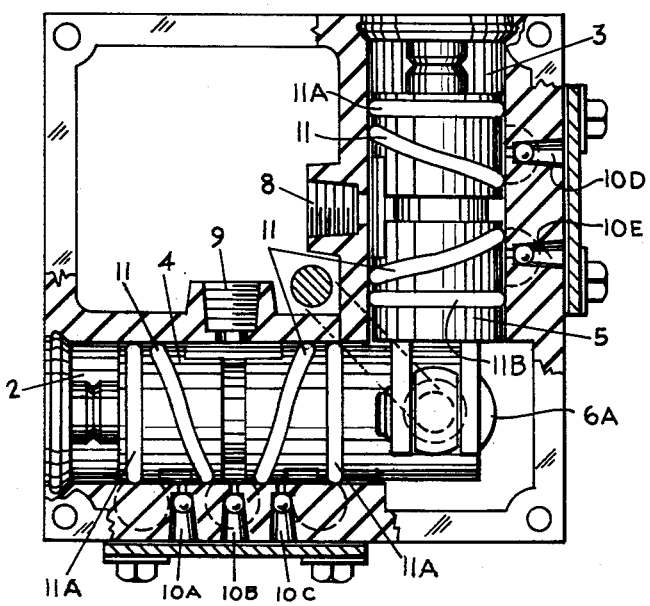
FIG. 3 is a top view of FIGS. 1 and 2 with the cover removed, partly in section, showing the slide valves in their respective bores in central or neutral positions.
Figure 5:
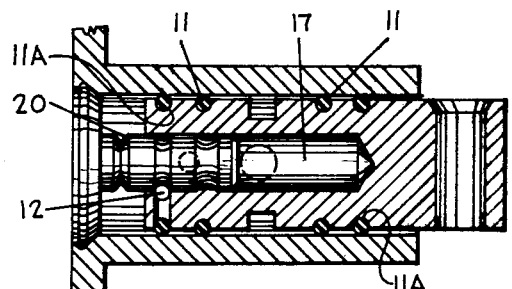
FIG. 5 is a section through FIG. 4 at line A—A.
Figure 4:
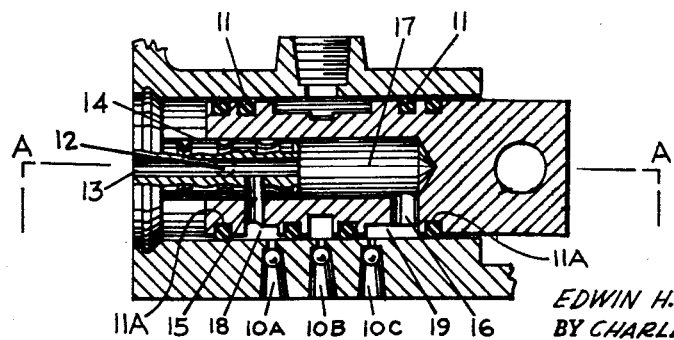
FIG. 4 is a sectional view of one of the bores and its slide valve showing a detent ball member held in place by a spring not shown arranged to retain the slide valve in a selected location.
Figure 7:
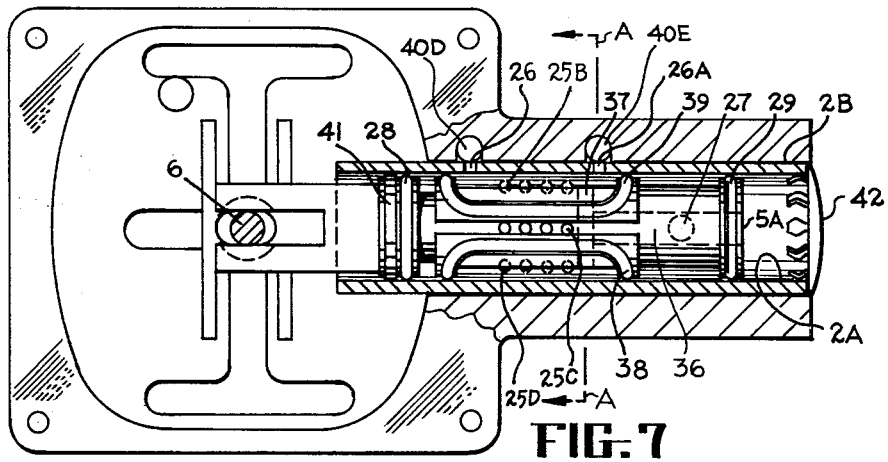
FIG. 7 is a top view, partly in section, showing an alternate design using a single slide valve.

FIG. 1, numeral 1, designates a casing provided with cylindrical bores 2 and 3 to receive slide valves 4 and 5, which are operated by shift lever 6. Shift lever 6 is connected to slide valve 5 by connection 6–A, which provides longitudinal movement of said valve which is also rotated by said shift lever, spherical section 6–B at bottom of shaft lever 6, which fits into hole 4–A in slide valve 4 and provides longitudinal movement to said valve when slide valve 5 is rotated and also provides leverage for longitudinal movement of valve 5. Slots 7, in cover plate 8–A, position shift lever 6 to any of the desired positions by movement of grip 9–B. Spring 9–A retains stop 10 to prevent entry into the reverse travel position until grip 9–C is manually raised to permit entry into the reverse position by raising it over stop boss 21. When shift lever 6 is positioned as shown in FIG. 7, slide valves 4 and 5 are positioned as shown in FIG. 3. Fluid under pressure enters cylinder bores 2 and 3 through intake 8, FIG. 1, and intake 9, FIG. 2, and is communicated to service port 10–B, FIG. 4, as neither service ports 10–D or 10–E are open, no fluid pressure is delivered to actuator device not shown. The sealing O rings 11 are positioned at an angle to the longitudinal axis of slide valves 4 and 5, therefore, the intake ports 8 and 9 are never sealed and are always in communication with cylinder bores 2 and 3, at the same time service ports 10–A, 10–B and 10–C, as it requires fluid under pressure from port 10–A, 10–B or 10–C acting simultaneously with pressure from port 10–D or 10–E to operate the actuators, not shown, pressure from one of the three ports in bore 2 in conjunction with one of the two ports in bore 3 permits a total of six selected shift positions. When shift lever 6, as shown in FIG. 1, is moved in either right or left hand position, it will pivot on slide valve 5 and cause slide valve 4 to move longitudinally to the right or left hand position as shown in FIG. 2. Stop 21 prevents accidental positioning of shift lever to reverse position, thus providing a selection of 6 shift positions. In FIG. 5 detent ball 12 is shown at bottom of slide valve 4. Longitudinal bore 13 extends centrally through detent shift 14 and is in communication with ports 15 and 16 and hollow chambers 17 of slide valves 4 and 5. When slide valve 5 is in position as shown in FIG. 3, service port 10–B is in communication with intake 9, ports 10–A and 10–C are in venting position through outlet ports 18 and 19, FIG. 4. Slide valves 4 and 5 are provided with annular grooves to receive commercial O ring seals 11. Slide valves 4 and 5 are also provided with annular grooves to receive load carrying rings 11–A as shown in FIGS. 1 and 2.

Figure 6:
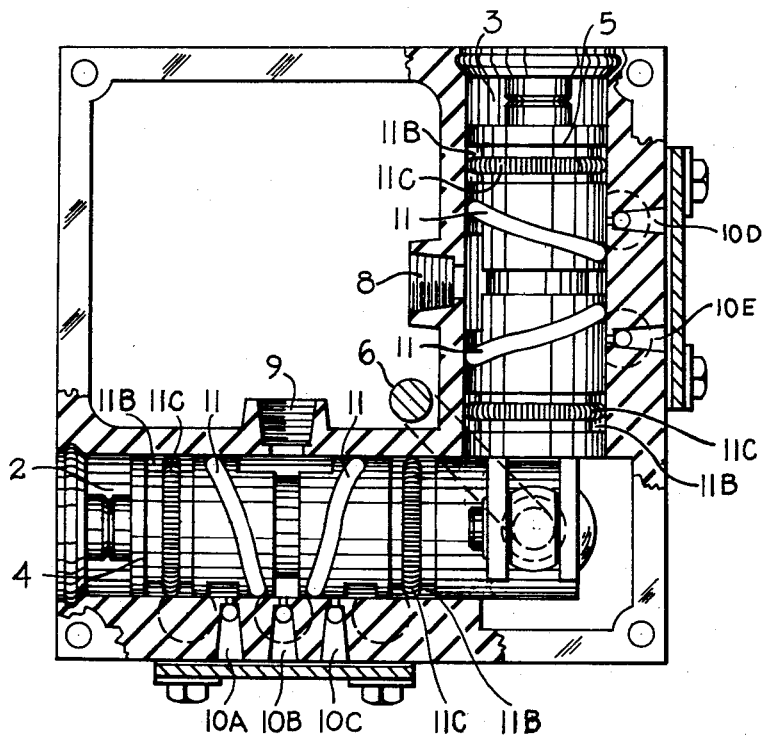
FIG. 6 is a top view of FIGS. 1 and 2, with cover removed as in FIG. 3, and shows load carrying garter springs surrounding each end of slide valves.

A preferred form of load carrying rings is shown in FIG. 6, which is a garter spring 11–C arranged to roll in groove 11–B. When slide valves 5 and 6 are moved longitudinally in either direction, the garter springs 11–C support slide valves 5 and 6 and prevent a high coefficient of friction between the outside diameter of the valves and cylindrical bores and thereby provide easy movement of shift lever 6.

Figure 9:
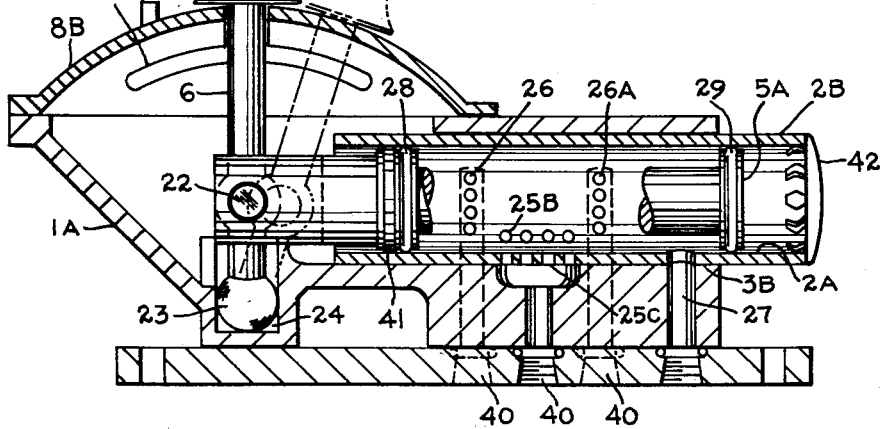
FIG. 9 is a side view, partly in section, of FIG. 7.

FIGS. 9 and 10 show the invention embodying a single slide valve 5–A with wear rings 41 received within cylindrical bore 2–A in cylinder 2–B, which is pressed in bore 3–B or casing 1–A. Shift lever 6 is connected to slide valve 5–A by pin 22. The lower end of shift lever 6 is provided with a spherical member 23, which is received in transverse slot 24, providing means to move slide valve 5–A longitudinally by shift lever 6 when said shift lever 6 is moved in positions as shown by arrows 25. Slide valves 5–A may also be rotated by shift lever 6 when said shift lever 6 is moved to its right or left hand positions as shown by arrows 25–A, FIG. 10. Cover plate 8–B is provided with slots 7–B, which guide shift lever 6 in its various longitudinal, transverse and rotated positions. Stop 10 and boss 21, FIG. 10, prevent movement of shift lever into the reverse position until finger grip 9–C is lifted upward which releases stop 10 from contact with boss 21 and permits entry to this position. Cylinder bore 2–B is provided with three rows of longitudinal placed discharge ports 25–B, 25–C and 25–D and two rows of transversely placed discharge ports 26 and 26–A and intake port 27. Slide valve 5–A is provided with O rings 28 and 29, located at each end thereof, and two O rings seals 38 and 39, which do not encircle slide valve 5-A but enclose a portion of the surface area on opposite sides of its circumference.

Figure 8:
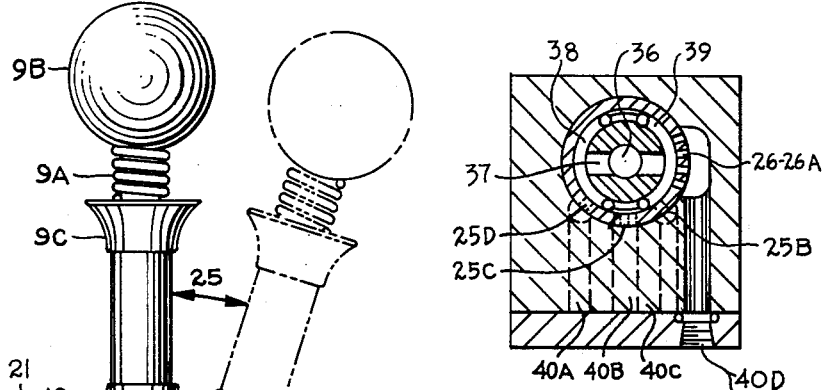
FIG. 8 is an end sectional view of FIG. 7 taken at line A—A.

To perform the functions desired and deliver fluid under pressure to service ports 40, fluid under pressure is supplied to two discharge ports at the same time. How this is achieved is described as follows. Referring to FIG. 9, pressurized fluid enters cylinder bore 2-A through intake port 27 and is contained in the area between seals 28 and 29, but is excluded from the areas enclosed by O rings 38 and 39 which areas are always in communication with the atmosphere through ports 36 and 37, see FIG. 8. Fluid under pressure is required through one of ports 25-B, 25-C, or 25-D, acting simultaneously with pressure through one of ports 26 or 26-A to operate the actuators, not shown. In FIG. 8, ports 25-C are shown in communication with pressure in bore 2-A as O rings 38 and 39 are positioned on either side of ports 25C while ports 25-B and 25-D are in communication with the areas enclosed by rings 38 and 39 and therefore with the venting ports 36 and 37. FIG. 7 shows ports 26 and 26-A are also in communication with the venting area. By moving slide valve 5-A to the right, ring 39 passes ports 26 which now are in communication with pressure in bore along with ports 25-C, thus energizing actuator. When valve 5-A is moved to the left, ports 25-C and 26-A are put in comunication with pressure. FIGS. 7 and 8 show when slide valve 5-A is rotated in a counter-clockwise direction, ports 25-C are sealed off and ports 25-B are in communication with pressure. Slide valve 5-A may now be moved to put ports 25-B and 26 or 25-B and 26-A in simultaneous communication with pressure. Likewise, clockwise rotation of said valve will put ports 25-D and 26 or 25-D and 26-A in said communication, thereby providing means to select six service combinations through outlets 40-A, B and C in conjunction with outlets 40-D and E. Slide valve 5-A has a centrally located longitudinal bore 36 for a portion of its length and a transverse hole 37 communicating with the surface areas enclosed by sealing O rings 38 and 39. By this arrangement of parts and ports each time any service port is sealed off from pressure, it is immediately vented. The valve and port arrangement shown in FIGS. 7, 9 and 10 permit pressurized fluid to surround slide valve 5-A, thereby equalizing the pressure and not requiring the load carrying rings 11-A as shown in FIG. 6. Closure cap 42 prevents dirt or other foreign matter from accumulating in bore 2-A.

No description or disclosure of actuators to be operated by the control valve described in these specifications is herein given as such devices may be of numerous design and used for a great many purposes.

Having thus described my invention, what I claim as new and desire to secure by Letters Patent is:

A pressure control system of the type designated, comprising a casing provided with a cylindrical bore connected to a plurality of inlet and outlet ports, a second cylindrical bore connected to a plurality of other inlet and outlet ports, a slide valve within each of said cylindrical bores, a single shift lever pivotally connected to each of said slide valves arranged to move said slide valves longitudinally and rotatably to open and close selected outlet ports.

References Cited in the file of this patent

UNITED STATES PATENTS

| | | |
|---|---|---|
| 900,045 | Thomas | Sept. 29, 1908 |
| 1,967,851 | Wilson | July 24, 1934 |
| 2,203,939 | Barrett | June 11, 1940 |
| 2,547,254 | Braithwaite | Apr. 3, 1951 |
| 2,911,006 | Vogel | Nov. 3, 1959 |
| 2,935,089 | Christie | May 3, 1960 |